United States Patent [19]

Nishimura et al.

[11] 4,290,513

[45] Sep. 22, 1981

[54] OPERATION OIL SUPPLY APPARATUS IN OIL PRESSURE OPERATED TYPE TRANSMISSION FOR VEHICLE

[75] Inventors: Sadanori Nishimura, Omiya; Yoji Yamada, Kawagoe, both of Japan

[73] Assignee: Honda Giken Kogyo Kabushiki Kaisha, Tokyo, Japan

[21] Appl. No.: 80,781

[22] Filed: Sep. 28, 1979

[30] Foreign Application Priority Data

Oct. 2, 1978 [JP] Japan .................. 53/120405

[51] Int. Cl.³ .................. F16D 39/00; F16D 25/10
[52] U.S. Cl. .................. 192/3.22; 192/3.27; 192/3.3; 192/87.15
[58] Field of Search .................. 192/3.57, 3.62, 3.27, 192/3.61, 3.22, 87.19, 87.18, 3.28, 3.29, 3.3, 3.33, 87.15, 87.14, 87.13, 87.11, 87.1

[56] References Cited

U.S. PATENT DOCUMENTS

| | | |
|---|---|---|
| 2,300,865 | 11/1942 | Berger . |
| 2,897,690 | 8/1959 | Maier .................. 192/3.25 X |
| 3,099,166 | 7/1963 | Schon . |
| 3,126,079 | 3/1964 | Howard . |
| 3,165,946 | 1/1965 | Wayman . |
| 3,319,745 | 5/1967 | Hilpert .................. 192/87.11 X |
| 3,416,393 | 12/1968 | Hattori et al. . |
| 3,425,293 | 2/1969 | Krawczyk et al. .................. 192/3.57 X |
| 3,497,043 | 2/1970 | Leonard .................. 192/3.3 X |
| 3,719,102 | 3/1973 | Leber et al. .................. 192/3.57 X |
| 3,799,308 | 3/1974 | Erisman .................. 192/3.57 X |
| 4,041,701 | 8/1977 | Goto et al. .................. 192/3.3 |

*Primary Examiner*—George H. Krizmanich
*Attorney, Agent, or Firm*—Haseltine and Lake

[57] ABSTRACT

An operation oil supply apparatus in oil pressure operated type transmission of such an arrangement that there are contained, in a transmission casing, high speed and low speed driving trains having therein high speed and low speed oil pressure clutches mounted on a pair of rotary shafts, and a valve block having a manual valve and a shift valve, and the manual valve has a 1st forward running range in which oil supply is given selectively to any of the oil pressure clutches and a 2nd forward running range in which oil supply to the high speed oil pressure clutch is cutoff and oil supply is given to the low speed oil pressure clutch. The high speed oil pressure clutch is arranged to be given oil supply by such an arrangement that an oil supply pipe projecting from the transmission casing is inserted in a center opening made in the rotary shaft supporting the clutch. The low speed oil pressure clutch is arranged to be given oil supply through an oil supply opening made in an extension which surrounds the rotary shaft supporting the clutch and projects from the valve block towards the clutch side.

4 Claims, 7 Drawing Figures

OPERATION OIL SUPPLY APPARATUS IN OIL PRESSURE OPERATED TYPE TRANSMISSION FOR VEHICLE

BACKGROUND OF THE INVENTION

This invention relates to an operation oil supply apparatus in an pressure operated type transmission for a vehicle such as a motorcar or the like.

As for the apparatus of this kind, the applicants of this application have previously proposed such a type one that an oil supply pipe provided upright on a transmission casing is inserted in an axially directional center opening made in a rotary shaft supporting each oil pressure clutch for effecting oil supply to each oil pressure clutch, and sealing between a stationary oil passage connected to a valve block and a rotary oil passage connected to an oil pressure clutch is made by using a seal member of a small diameter between the oil supply pipe and the center opening so that lowering of the transmission efficiency of the transmission caused by a friction loss of the seal member may be prevented. However, such an arrangement has been usual with this type of apparatus that the oil supply pipe is inserted into the center opening from one end of the rotary shaft on the other side wall portion side which is remote from the valve block, and consequently the oil passage ranging from the valve block to the oil pressure clutch becomes large in length, and delay in operation of the oil pressure clutch is resulted. With this arrangement, in a case where the manual valve is constructed into a type having a 1st forward running range in which oil supply is given selectively to any of the respective oil pressure clutches and a 2nd forward running range in which oil supply to the high speed oil pressure clutch is cut off and oil supply is given to the low speed oil pressure clutch, there is caused such an inconvenience that when the manual valve is changed over to the 2nd forward running range for obtaining a rapid acceleration or an engine brake, a sufficient acceleration property or engine brake operation cannot be obtained because of delay in operation of the low speed oil pressure clutch.

SUMMARY OF THE INVENTION

The object of this invention is to provide an apparatus free from the inconvenience as mentioned above, and according to this invention, in an apparatus of the type that, in transmission casing, there are contained a transmission mechanism having at least two stage driving trains of a low speed and a high speed having therein oil pressure clutches of a low speed and a high speed respectively on a pair of rotary shafts extending between one side wall portion and an opposite side wall portion of the transmission casing, and a valve block attached to the one side wall portion and having a manual valve and a shift valve for controlling oil supply to the respective oil pressure clutches, and the manual valve has a 1st forward running range in which oil supply is directed selectively through said shift valve to the respective oil pressure clutches and a 2nd forward running range in which oil supply to the high speed oil pressure clutch is cutoff and oil supply is given to the low speed oil pressure clutch, it is characterized in that the high speed oil pressure clutch supplied with oil under pressure by an oil supply pipe which extends into an axially extending central opening in the rotary shaft supporting the high speed oil pressure clutch from one end of the shaft, and the low speed oil pressure clutch supplied with oil under pressure through an oil supply opening in an extension of the valve block which surrounds the rotary shaft supporting the low speed oil pressure clutch.

DESCRIPTION OF THE PREFERRED EMBODIMENTS

One embodying example of this invention will now be explained with reference to the attached drawings.

Figure 1:
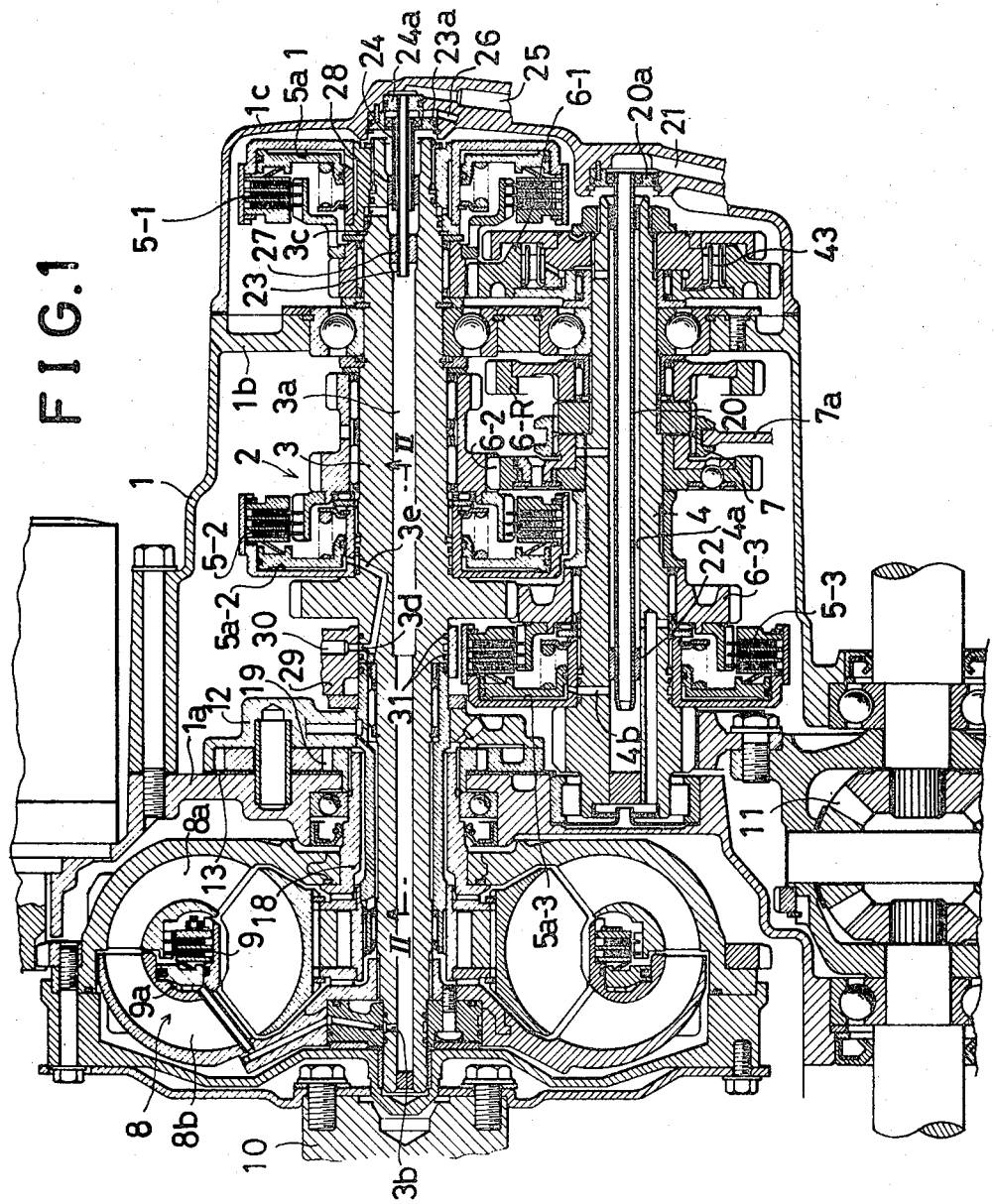
FIG. 1 is a sectional plan view of one example of this invention apparatus.

Referring to the drawings, numeral 1 denotes a transmission casing, and numeral 2 denotes a transmission mechanism contained in the transmission casing 1. As shown in FIG. 1, the transmission mechanism 2 includes 1st and 2nd rotary shafts 3, 4 which are rotatably supported in bearings in left and right side wall portions 1a, 1b of the transmission casing 1.

A portion of the shaft 3 extending to the right hand side of the wall 1b carries an oil pressure operated clutch assembly 5-1 of a first or lowest speed drive train 6-1, the clutch and drive train being of conventional construction and including a hydraulic actuator having a piston and cylinder arrangement 5a-1 which is splined to the shaft 3, and which is operative when energized to couple a drive pinion thereof to the shaft 3.

The pinion of the clutch assembly 5-1 drives a pinion of the lowest speed drive train 6-1, which is coupled to shaft 4 by a unidirectional clutch 43 of any conventional construction. Upon energization of the lowest speed clutch assembly, a direct drive is provided from the shaft 3 via the lowest speed drive train to the shaft 4, which in turn drives a conventional output differential 11 via a drive pinion fast with the shaft 4 and a driven pinion fast with a housing of the differential.

Mounted on the shaft 3 at a position intermediate the walls 1a and 1b is an oil pressure operated clutch assembly 5-2 of a second or low speed drive train 6-2, the clutch and drive train again being of conventional construction and including a hydraulic actuator having a piston and cylinder arrangement 5a-2 which is splined to the shaft 3, and which is operative when energized to couple a double drive pinion thereof to the shaft 3. One pinion of the double drive pinion is meshed with a driven pinion of the second or low speed drive train 6-2, which is journalled for rotation on the shaft 4 and which is selectively coupled to the shaft 4 by an axially slidable dog clutch 7.

The other drive pinion of the double drive pinion of the second or low speed clutch assembly 5-2 forms part of a conventional reverse drive train 6-R, and is meshed with an idler pinion (not shown), which is turn is meshed with a drive gear journalled for rotation on the shaft 4, and which is selectively coupled to the shaft 4 by said axially slidable dog clutch 7 when in the other of its axial positions.

A third or high speed oil pressure operated clutch 5-3 and drive train 6-3 is comprised by a drive pinion mounted on the shaft 3 and which is meshed with a driven pinion journalled for rotation on the shaft 4 and which is coupled to the shaft 4 by the third or high speed clutch assembly 5-3, again in an entirely conventional manner.

Referring to the drawings, numeral 8 denotes a torque convertor provided on the outside the foregoing left side wall portion 1a and having therein a direct coupling oil pressure clutch 9.

Figure 2:
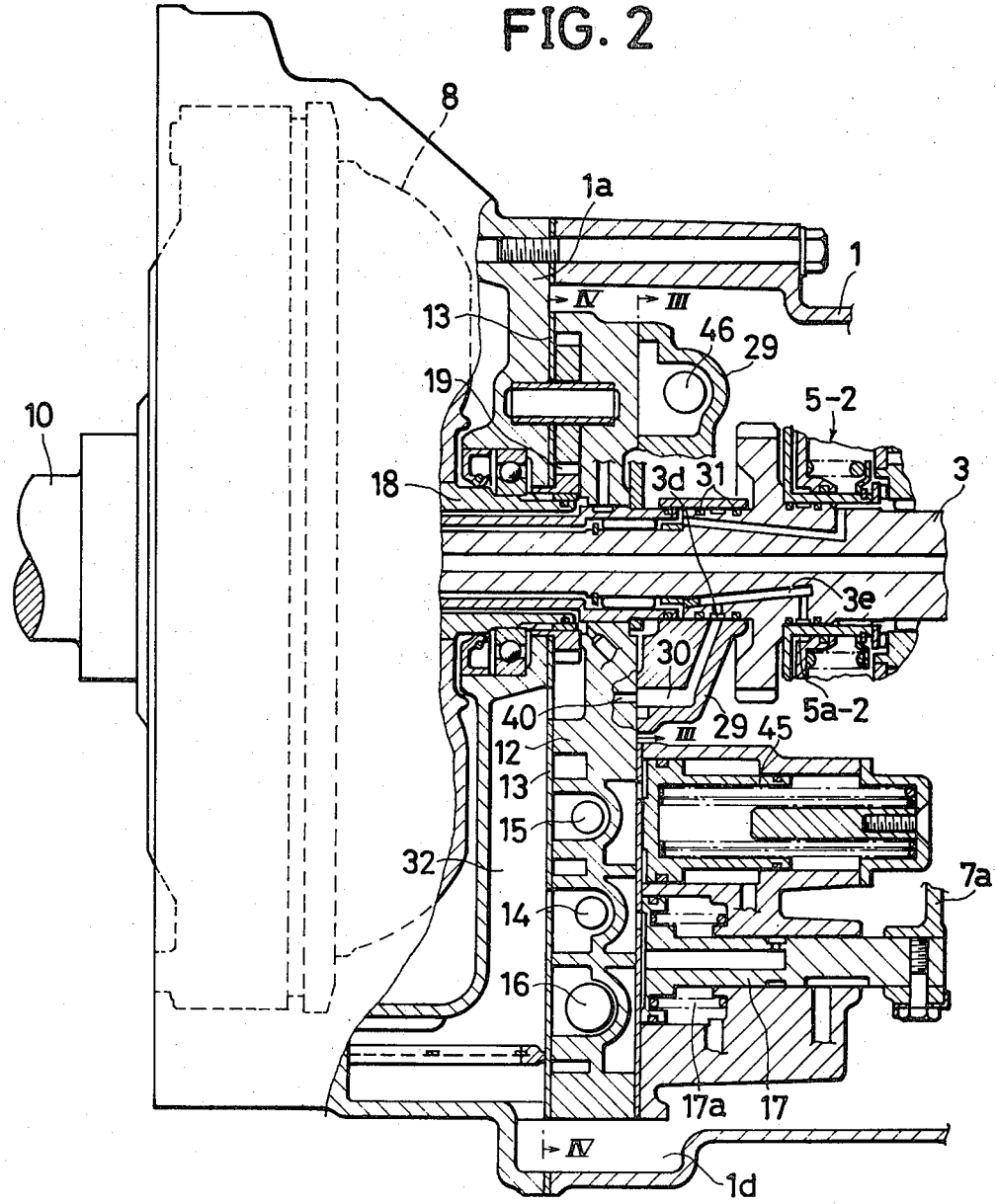
FIG. 2 is a sectional view taken along the line II—II in FIG. 1.

The torque convertor 8 is connected at an impeller part 8a thereof to an output shaft 10 of an engine and at a turbine part 8b thereof to an end of the 1st rotary shaft 3 projecting leftwardly from the side wall portion 1a so that a power from the engine may be transmitted to the differential gear 11 through the torque convertor 8, the 1st rotary shaft 3, the respective driving trains 6-1, 6-2, ... and the 2nd rotary shaft 4. Referring to the drawings, numeral 12 denotes a valve block attached through a separator plate 13 to the foregoing left side wall portion 1a. As shown in FIG. 2, the valve block 12 is provided, below the 1st rotary shaft 3 with a manual valve 14, a 1st shift valve 15 for making a speed-change between a 1st speed and a 2nd speed, a 2nd shift valve 16 for making a speed-change between a 2nd speed and a 3rd speed, and a servo valve 17 for changing over between forward and reverse drive and which is connected to a shift fork 7a of the selector 7 which selectively connects either the driven gear of the second or low speed drive train 6-2 to the shaft 4, or connects the driven gear of the reverse drive train 6-R to the shaft 4.

The valve block 12 includes a lateral extension which surrounds the shaft 3 and which provides a housing for a gear pump 19, the gears of which are driven by a shaft 18 which is coaxial with the shaft 3, and which extends to the lefthand side of the wall 1a to a connection with the impeller 8a of the torque convertor.

Oil supply from the valve block 12 to the 3rd speed oil pressure clutch 5-3 is to be made by such an arrangement that, as shown in FIG. 1, an oil supply pipe 20 provided upright on a cover 1c of the right end of the transmission casing 1 is inserted in an axially directional center opening 4a made in the 2nd rotary shaft 4 supporting the oil pressure clutch 5-3. Namely, the oil supply pipe 20 is in communication, at its base portion, with an oil supply opening 21 for a 3rd speed use connected to the valve block 12, so that pressure oil from the oil supply pipe 20 is supplied to an oil pressure operation chamber 5a-3 of the 3rd speed oil pressure clutch 5-3 through a radially directional oil opening 4b which is in communication with such a closed side portion of the center opening 4a that is closed by a seal member 22 interposed between the oil supply pipe 20 and the center opening 4a. Further, such an arrangement is also provided between the foregoing direct coupling oil pressure clutch 9 and the 1st oil pressure clutch 5-1 that inner and outer double oil supply pipes 23, 24 provided upright on the cover 1c are inserted in an axially directional center opening 3a made in the 1st rotary shaft 3 so that oil supply may be carried out. Base portions of the respective oil supply pipes 23, 24 are in communication with respective oil supply openings 25, 26 for direct coupling use and for the 1st speed use made in the cover (1c), and the inner oil supply pipe 23 is in communication with an oil pressure operation chamber 9a of the direct coupling oil pressure clutch 9 through a radially directional oil opening 3b connected to such a closed portion at the forward end portion of the center opening 3a that is closed by a seal member 27 interposed between the pipe 23 and the center opening 3a, and also the outer oil supply pipe 24 is in communication with an oil pressure operation chamber 5a-1 of the 1st speed oil pressure clutch 5-1 through a radially directional oil opening 3c connected to such a closed portion at a base portion of the center opening 3a that is closed by a seal member 28 interposed between the pipe 24 and the center opening 3a and the foregoing seal member 27.

Furthermore, the foregoing oil supply pipes 20, 23, 24 are supported tiltably by the cover 1c through respective support plates 20a, 23a, 24a, and even where the axial center lines of the respective rotary shafts 3, 4 and those of the respective pipes 20, 23, 24 are not in alignment with each other, the respective pipes 20, 23, 24 can follow easily the rotations of the respective rotary shafts 3, 4, so that unequal wearing of the seal members 22, 27, 28 can be prevented. The above construction is not especially different from the previously proposed one as mentioned above. According to this invention, that the oil supply to the 2nd or low speed oil pressure clutch 5-2 is through an oil supply opening 30 formed in an extension 29 integral with the valve block 12.

Figure 3:
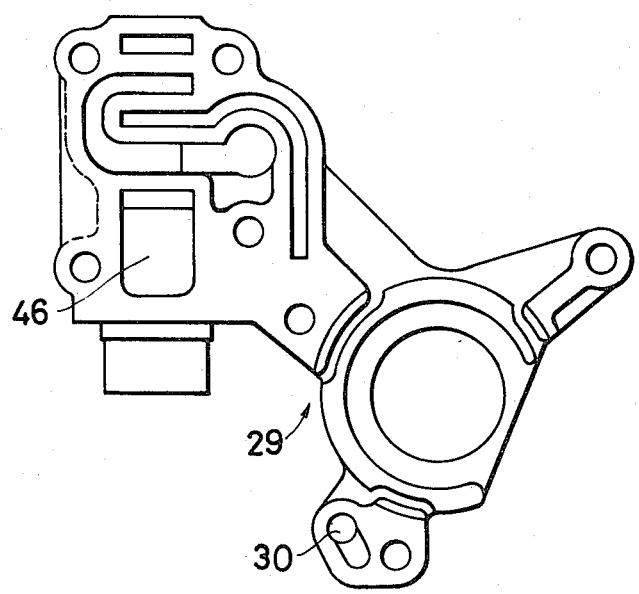
FIG. 3 and FIG. 4 are end views taken along the lines III—III and IV—IV in FIG. 2.

More in detail, as shown in FIGS. 1 to 3, the extension 29 is formed by attaching to the right side of the valve block 12 containing an oil pressure pump 19 a block portion surrounding the 1st rotary shaft 3 and extending towards the 2nd speed oil pressure clutch 5-2. An oil supply opening 30 for a 2nd speed use is made open in an inner peripheral surface of the extension 29, and is made in communication with the oil pressure operation chamber 5a-2 of the 2nd speed oil pressure clutch 5-2 through an outer annular groove 3d of the 1st rotary shaft 3 and an oil opening 3e of a thick portion thereof, and consequently the length of an oil passage extending from the valve block 12 to the 2nd speed oil pressure clutch 5-2 becomes much shorter than that of an oil passage to the foregoing respective oil pressure clutches 5-1, 5-3, 9. In this case, sealing between the oil supply opening 30 and the annular groove 3d is effected by seal rings 31, 31 provided on the right and the left of the annular groove 3d. The seal rings 31, 31 become larger in diameter than the foregoing seal members 22, 27, 28, and this results in lowering of the transmission efficiency of the transmission by friction. However, the seal members 22, 27, 28 sealing the oil passages to the other oil pressure clutches 5-1, 5-3, 9 can be made smaller in diameter, so that as a whole such a lowering in the transmission efficiency as to call to account is not brought about.

Figure 5:
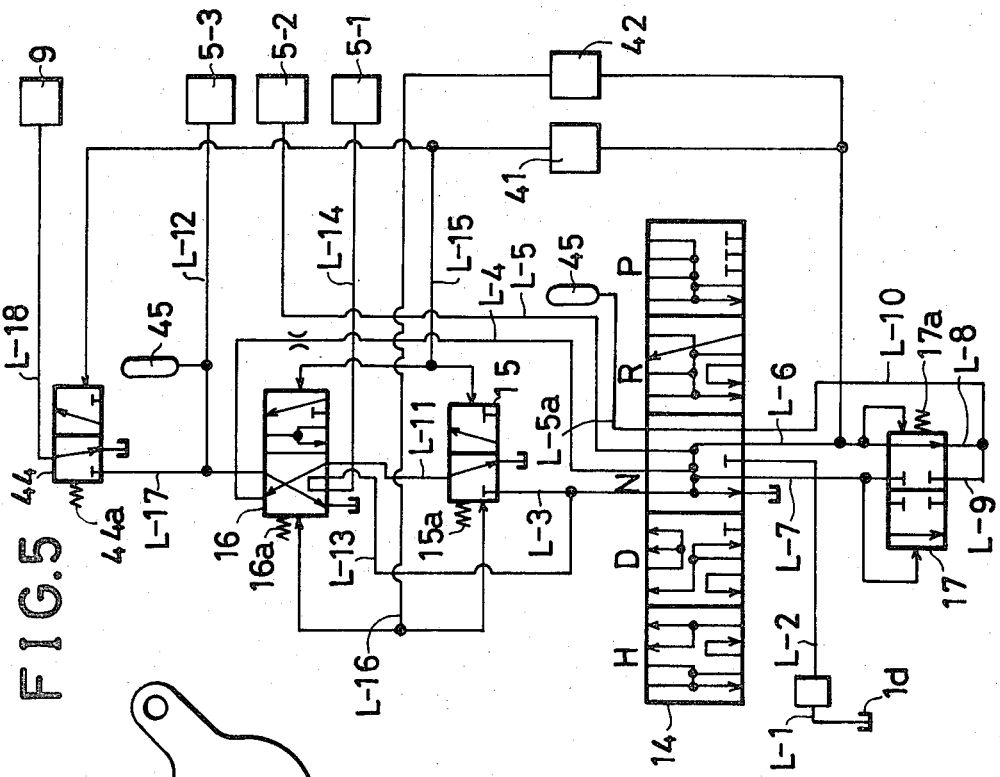
FIG. 5 is an oil pressure circuit diagram.
Figure 4:
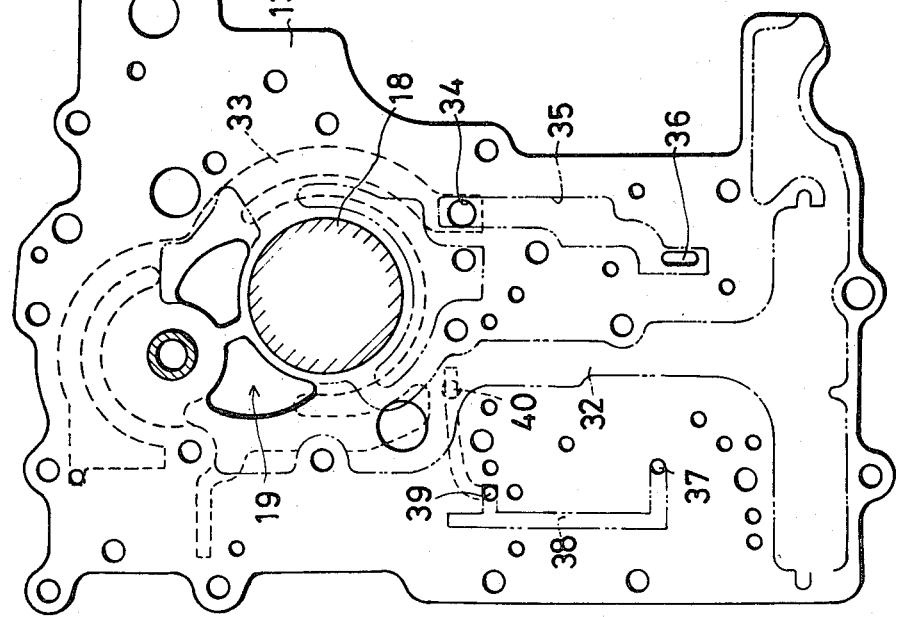
Figure 6:
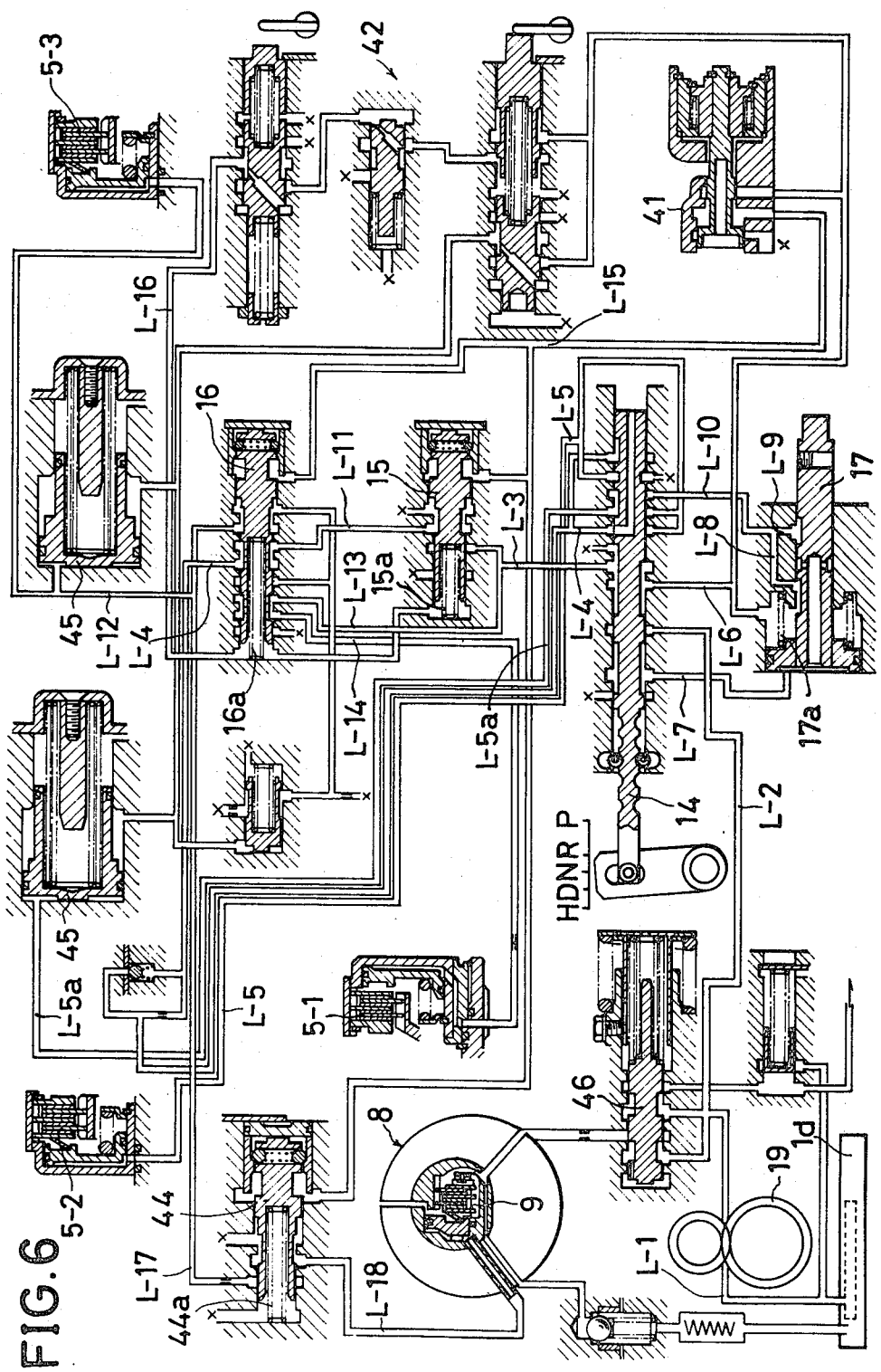
FIG. 6 is a diagram showing a concrete construction of the oil pressure circuit.

FIG. 5 and FIG. 6 show an oil pressure circuit. As shown in FIGS. 2 and 4, an oil tank 1d formed at the bottom of the transmission casing 1 is in communication with an oil pressure pump 19 through a 1st oil passage L-1 comprising a groove 32 formed in the left side wall portion 1a and the oil pressure pump 19 is in communication with the manual valve 14 through a 2nd oil passage L-2 comprising a groove 33 of the valve block 12, an opening 34 of the separator plate 13, a groove 35 of the left side wall portion 1a and an opening 36 of the separator plate 13.

The manual valve 14 is connected, in addition to the 2nd oil passage L-2, respectively to a 3rd oil passage L-3 connected to an inlet side of the shift valve 15, a 4th oil passage L-4 connected to an outlet side of a 2nd shift valve 16, a 5th oil passage L-5 connected to the 2nd oil pressure clutch 5-2, a 6th and a 7th oil passages L-6, L-7 connected to an inlet side of the servo valve 17 and a 10th oil passage L-10 connected to a 8th and a 9th oil passage L-8, L-9 on an outlet side thereof. Additionally, the manual valve 14 is so arranged as to be operated to be given a changeover movement to any of five ranges comprising an automatic shift range D which is a 1st forward running range, a hold range H which is a 2nd forward running range, a neutral range N, a reverse running range R and a parking range P, and thereby the foregoing respective oil passages L-2, L-3, . . . may be selectively connected as explained hereinafter. In this embodiment, the 5th oil passage L-5 is composed of an opening 37 of the separator plate 13, a groove 38 of the left side wall portion 1a, an opening 39 of the separator plate 13, an oil opening 40 of the valve block 12 and the foregoing oil supply opening 30 formed in the extension 29 of the valve block 12. The foregoing 1st and 2nd shift valves 15, 16 are interconnected through an intermediate 11th oil passage L-11, and a 12th oil passage L-12 connected to the 3rd oil pressure clutch 5-3 is led out, besides the foregoing 4th oil passage L-4, from the outlet side of the 2nd shift valve 16, and the inlet side of the 2nd shift valve 16 is connected to a 13th oil passage L-13 branched from the 3rd oil passage L-3 and the outlet side thereof is connected to the 14th oil passage L-14 connected to the 1st speed oil pressure clutch 5-1.

In this case, the 12th oil passage L-12 and the 14th oil passage L-14 are constructed respectively by the foregoing oil supply openings 21, 26 for the 3rd speed use and the 1st speed use and the oil supply pipes 20, 24.

The 1st and 2nd shift valves 15, 16 are so arranged as to be applied, at their respective one ends, namely, at the right ends in the drawings, with a governor pressure corresponding to a vehicle speed from a governor valve 41 through a 15th oil passage L-15 and at their left ends respectively with a throttle pressure corresponding to a throttle degree from a throttle valve 42 through a 16th oil passage L-16 and with spring forces of springs 15a, 16a.

Thus, at a low vehicle speed with a low governor pressure, the 1st and 2nd shift valves 15, 16 are both moved rightwards, and the 13th oil passage L-13 and the 14th oil passage L-14 are interconnected, and thus a 1st speed position for effecting oil supply to the 1st oil pressure clutch 5-1 is established. However, by rising of the governor pressure according to increase in the vehicle speed, such a changeover operation is carried out that, in the first place, the 1st shift valve 15 is moved leftwards, so that the 3rd oil passage L-3 is connected to the 11th oil passage L-11 and at the same time the 11th oil passage L-11 is connected to the 4th oil passage L-4, and thus a 2nd speed position for effecting oil supply to the 2nd speed oil pressure clutch 5-2 is established, and then the 2nd shift valve 16 is also moved leftwards, and the 11th oil passage L-11 is connected to the 12th oil passage L-12 and thus a 3rd speed position for effecting oil supply to the 3rd speed oil pressure clutch 5-3 is established. At the 2nd speed position, the 13th oil passage L-13 and the 14th oil passage L-14 are maintained in their connected condition and release of the1st speed oil pressure clutch 5-1 cannot be made, but power transmission through the 1st speed driving train 6-1 is prevented by a one-way clutch 43 interposed in the 1st speed driving train 6-1 as shown in FIG. 1.

The servo valve 17 is urged by a spring 17a to the forward running position on its left side so as to changeover the selector 7 to its forward running side, and in the H and D ranges of the manual valve 14 the same operates to connect the 6th oil passage L-6 connected to the 2nd oil passage L-2 to the 10th oil passage L-10 through the 8th oil passage L-8. However, in the R range of the manual valve 14 the same is so operated, by supply oil to the 7th oil passage connected to the 2nd oil passage L-2, as to move to its backward running side for changing over the selector 7 against the spring 17a to its reverse running side, and thus the 7th oil passage L-7 is connected through the 9th oil passage L-9 to the 10th oil passage L-10.

Referring to the drawings, numeral 44 denotes a direct coupling valve which is connected on its inlet side to a 17th oil passage L-17 diverged from the 12th oil passage L-12 and on its outlet side to a 18th oil passage L-18 connected to the direct coupling oil pressure clutch 9. The direct coupling valve 44 is applied at its one end, that is, at its right end, with the governor pressure and at its left end with a spring force of a spring 44a, and at the time of the high 3rd speed running, the same serves to connect the 17th oil passage L-17 to the 18th oil passage L-18 for tightening the direct coupling clutch 9. In this embodiment, the 18th oil passage L-18 is constructed by the foregoing oil supply opening 25 for the direct coupling use formed in the cover 1c of the transmission casing 1 and the oil supply pipe 23.

Referring to the drawings, numeral 45 denotes an accumulator connected to a subsidiary passage L-5a through the manual valve 14 to the 5th oil passage L-5 and to the 12th oil passage L-12, respectively. Numeral 46 denotes a regulator for regulating oil pressure from the oil pressure pump 19 to a pressure corresponding to a stator reaction force of the torque convertor 8 and supplying the same to the torque convertor 8 and the 2nd oil passage L-2. The regulator valve 46 is provided in the extension 29 of the valve block 12.

The operation of this invention apparatus will now be explained as follows. In the D range of the manual valve 14, the 2nd oil passage L-2 is connected to the 3rd oil passage L-3 and the 6th oil passage L-6, and thereby the oil supply to the 1st and 2nd shift valves 15, 16 and the changeover movement of the servo valve 17, and accordingly, the selector 7 to the forward running side are given, and also the 4th oil passage L-4 and the 5th oil passage L-5 are interconnected. By the foregoing changing over of the 1st and 2nd shift valves 15, 16 to any of the 1st to 3rd speed positions, pressure oil may be supplied selectively to any of the oil pressure clutches 5-1, 5-2, 5-3 for respective speeds, and thereby forward running of the vehicle at any of the 1st to the 3rd speeds by any of the driving trains 6-1, 6-2, 6-3 for respective speeds can be carried out.

If a changeover movement from the forward running at the 3rd speed in the D range of the manual valve 14 to the H range of the manual valve 14 for a rapid acceleration or an engine brake or the like is made, the 5th oil passage L-5 is connected to the 10th oil passage L-10 connected to the 2nd oil passage L-2 through the servo valve 17, and oil supply to the 2nd oil pressure clutch 5-2 without passing through the 1st and 2nd shift valves 15, 16 can be carried out, and the vehicle running by the 2nd driving train alone can be performed.

In this case, if the length of the 5th oil passage L-5 is made long, it would take much time to supply the pressure oil to the 2nd oil passage 5-2, resulting in delay in operation of the oil pressure clutch 5-2 and during this period the vehicle runs by inertia and sufficient acceleration and engine brake cannot be obtained. However, according to this invention, the 5th oil passage L-5 is constructed to be small in length by the oil supply opening 30 formed in the extension 29 of the valve block 12, so that such inconvenience as above is not caused at all.

Next, if the manual valve 14 is moved to be in the R range, the 2nd oil passage L-2 is connected to the 7th oil passage L-7 and a changeover movement of the servo valve 17, accordingly, the selector 7 to the reverse running side is given and the 5th oil passage L-5 is connected to the 10th oil passage L-10 connected through the servo valve 17 to the 7th oil passage, and oil supply is given to the 2nd speed oil pressure clutch 5-2, so that the reverse running of the vehicle is carried out by the reverse driving train 6-R. In this case, for carrying out the reverse running smoothly and accurately, a rapid operation of the 2nd oil pressure clutch 5-2 is required, and such a requirement can be met by such shortening the length of the 5th oil passage as mentioned above.

Figure 7:
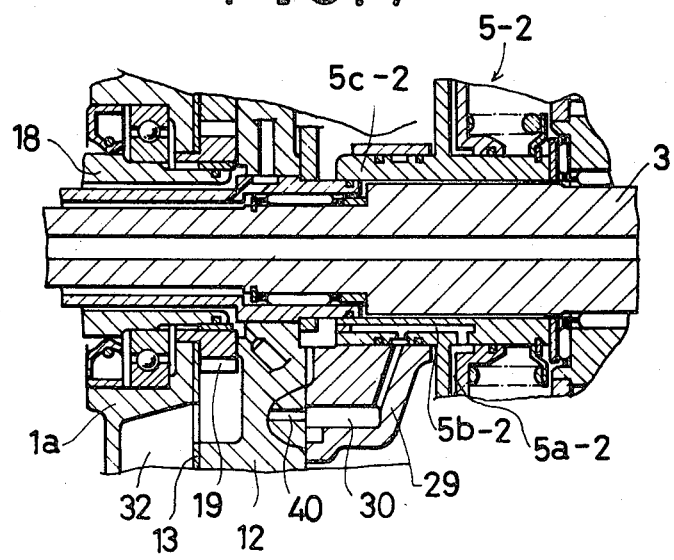
FIG. 7 is a partial sectional side view of another embodying example.

In the above embodiment, it is so arranged that the oil pressure from the supply oil opening 30 made in the extension 29 of the valve block 12 is supplied to the 2nd speed oil pressure 5-2 through the annular groove 3d and the oil opening 3e of the 1st rotary shaft 3. However, it may be so modified that, for instance, as shown in FIG. 7, a sleeve 5c-2 formed with an oil opening 5b-2 in communication with the oil pressure operation chamber 5a-2 of the 2nd speed oil pressure clutch 5-2 is so provided on the 2nd speed oil pressure clutch 5-2 as to project therefrom integrally.

It may be so modified that the sleeve 5c-2 is inserted in the extension 29 for effecting giving and taking of the oil therein.

Further, the 2nd forward running range of the manual valve 14 is not limited to the H range in the above embodiment, and this invention can be applied also to such a case that the automatic shift range for low speed for carrying out the oil supply to the oil pressure clutches 5-1, 5-2 of the 1st and 2nd speed is used as the 2nd forward running range.

Such an arrangement is preferable that, also in this case the oil supply to the 1st speed oil pressure clutch 5-1 is carried out through the oil supply pipe 24 and the transmission efficiency is improved.

The reason is that it hardly happens to obtain, at the time of changing over from the D range to the automatic shift range for low speed, an acceleration or an engine brake by the 1st speed driving train 6-1 by tightening directly the 1st speed oil pressure clutch 5-1 and any delay in operation of the 1st speed oil pressure clutch 5-1 does not matter.

In order to construct the transmission into a compact one, it is preferable that, as in the foregoing example, the 2nd and 3rd oil pressure clutches 5-2, 5-3 are so disposed right and left as not to be in alignment with each other on the 1st rotary shaft 3 on the input side and the 2nd rotary shaft 4 on the output side, and there is provided on the 1st rotary shaft 3 side a space for attaching the valve block 12 containing the oil pressure pump 19, and for the extension 29, but it is possible to dispose the two oil pressure clutches 5-2, 5-3 on the same rotary shaft.

Thus, according to this invention, the low speed oil pressure clutch which is to be supplied with oil in the 2nd forward running range of the manual valve is arranged to be supplied with pressure oil without delay in operation through the oil supply opening made in the extension extended from the valve block and, in the meanwhile, the high speed oil pressure clutch is arranged to be supplied with pressure oil through the oil supply pipe provided on the transmission casing, and thus lowering of a transmission efficiency as a whole of the transmission apparatus can be prevented, and an acceleration capability and an engine brakage action can be improved without much lowering of the transmission efficiency, and the defect in the previously proposed one as mentioned above can be removed without fail.

What is claimed is:

1. An operation oil supply apparatus in an oil pressure operated type transmission for a vehicle of such a constructional type that, in a transmission casing, there are contained a transmission mechanism having at least two stage driving trains of a low speed and a high speed including oil pressure clutches of a low speed and a high speed respectively on a pair of rotary shafts extending between one side wall portion and an opposite side wall portion of the transmission casing, and a valve block attached to the one side wall portion and having a manual valve and a shift valve for controlling oil supply to the respective oil pressure clutches and the manual valve has a 1st forward running range in which oil supply is directed selectively through said shift valve to the respective oil pressure clutches and a 2nd forward range in which oil supply to the high speed oil pressure clutch is cutoff and oil supply is given to the low speed oil pressure clutch, characterized in that the high speed oil pressure clutch is supplied with oil under pressure by an oil supply pipe which extends into an axially extending central opening in the rotary shaft supporting the high speed oil pressure clutch from one end of the shaft, and the low speed oil pressure clutch is supplied with oil under pressure through an oil supply opening in an extension of the valve block which surrounds the rotary shaft supporting the low speed oil pressure clutch.

2. An apparatus as claimed in claim 1, including an oil pressure pump having a housing integral with said valve block, a driving shaft coaxial with said rotary shaft which supports the low speed oil pressure clutch, a drive between said driving shaft and said pump, an impeller of a torque converter connected to an end portion of said driving shaft of the oil pressure pump and a turbine of the torque converter connected to an end portion of said supporting rotary shaft of the low speed oil pressure clutch.

3. An apparatus as claimed in claim 2, wherein the converter is provided with a direct coupling clutch between the impeller and the turbine, and the direct coupling clutch is supplied with an oil under pressure by an oil supply pipe which extends into an axially extending central opening in the rotary shaft supporting the low speed oil pressure clutch from one end of the shaft.

4. An apparatus as claimed in any of claims 1 to 3, including a reverse driving train, and a changeover clutch controlled by said manual valve for selectively connecting a driven gear of said low speed oil pressure clutch to either a driven gear of said low speed driving train or to a driven gear of said reverse driving train.

* * * * *